United States Patent
Motegi et al.

(10) Patent No.: US 6,798,727 B2
(45) Date of Patent: Sep. 28, 2004

(54) OPTICAL PICKUP APPARATUS

(75) Inventors: Takehiro Motegi, Saitama (JP);
Shinichi Takahashi, Saitama (JP);
Mitsutoshi Sugano, Saitama (JP); Ko Ishii, Saitama (JP); Makoto Kawamura, Saitama (JP); Yoshihiro Seita, Saitama (JP)

(73) Assignee: Pioneer Corporation, Tokyo (JP)

( * ) Notice: Subject to any disclaimer, the term of this patent is extended or adjusted under 35 U.S.C. 154(b) by 214 days.

(21) Appl. No.: 09/955,978

(22) Filed: Sep. 20, 2001

(65) Prior Publication Data

US 2002/0036972 A1 Mar. 28, 2002

(30) Foreign Application Priority Data

Sep. 26, 2000 (JP) .................................. P.2000-292362

(51) Int. Cl.⁷ .................................................. G11B 7/00
(52) U.S. Cl. .................................. 369/112.29; 369/116
(58) Field of Search .......................... 369/44.23, 44.24, 369/44.37, 112.28, 112.29, 94, 110.01, 110.02, 110.04, 116, 44.31, 53.27, 53.26

(56) References Cited

U.S. PATENT DOCUMENTS

| | | | |
|---|---|---|---|
| 4,721,850 A | 1/1988 | Sakai et al. | 250/201 |
| 4,942,584 A | 7/1990 | Karaki et al. | 372/29 |
| 5,146,449 A | 9/1992 | Shimozawa | 369/106 |
| 5,563,870 A | 10/1996 | Silverstein | 369/112 |
| 5,598,394 A | 1/1997 | Hibino et al. | 369/112 |
| 5,621,714 A | 4/1997 | Kobayashi et al. | 369/103 |
| 6,041,027 A * | 3/2000 | Kim et al. | 369/44.24 |
| 6,552,974 B1 * | 4/2003 | Kim | 369/44.37 |

FOREIGN PATENT DOCUMENTS

| | | |
|---|---|---|
| EP | 0 671 732 A1 | 9/1995 |
| EP | 0 786 836 | 7/1997 |
| EP | 0 786 839 A1 | 7/1997 |
| EP | 0 969 456 A1 | 1/2000 |
| EP | 1 001 414 | 5/2000 |
| EP | 1 041 546 A1 | 10/2000 |
| EP | 1 047 051 | 10/2000 |
| EP | 1 073 045 | 1/2001 |
| EP | 1 160 778 A2 | 12/2001 |
| EP | 1 191 522 | 3/2002 |
| JP | 11-39701 | 2/1999 |

* cited by examiner

Primary Examiner—Thang V. Tran
(74) Attorney, Agent, or Firm—Morgan, Lewis & Bockius LLP

(57) ABSTRACT

A reflective mirror 14 is inclined and placed with respect to an objective lens 16 and a photoelectric conversion element 15 for monitor is placed in the back side of the reflective mirror 14. The reflective mirror 14 is formed into a structure in which a semi-transmission film HM having predetermined reflectance and transmittance is formed on one surface of a substrate of a transparent medium. When a laser beam for information record or information reproduction is launched from semiconductor lasers 2a, 3 to the reflective mirror 14, the semi-transmission film HM splits the laser beam into a reflected beam and a transmitted beam and the reflected beam is emitted to the side of the objective lens 16 and the transmitted beam is emitted to the side of the photoelectric conversion element 15. As a result of this, any laser beams for the information record and the information reproduction can be detected by one photoelectric conversion element 15 to perform APC control of the semiconductor lasers 2a, 3 and the intensity of the laser beam for the information record and the information reproduction with respect to an information record medium can be controlled properly.

6 Claims, 8 Drawing Sheets

OPTICAL PICKUP APPARATUS

BACKGROUND OF THE INVENTION

1. Filed of the Invention

The present invention relates to an optical pickup apparatus for making information record or information reproduction with respect to an optical type information record medium by using a light beam, and particularly to an optical pickup apparatus equipped with a monitor mechanism for controlling the light beam to be proper optical intensity.

2. Description of the Related Art

In an optical pickup apparatus, when a light beam for information record or information reproduction is applied to information record media such as a CD (Compact Disk), a DVD (Video Disk), or the like, optical intensity of the light beam is detected to control driving electric power of a semiconductor laser, which is a light emission source, is performed by an APC circuit (automatic power control circuit), feedback. Also, as a method for detecting the optical intensity of the light beam, a back monitor method has been known.

In this back monitor method, a semiconductor laser for emitting laser beams in two directions backward and forward is used. Then, the laser beam emitted from the forward end of the semiconductor laser is used for information record or information reproduction and the laser beam emitted from the backward end of the semiconductor laser is detected by a photodetector and a detection signal outputted from the photodetector is supplied to the APC circuit and the feedback control is performed so that the driving electric power of the semiconductor laser becomes a predetermined target value and thereby the optical intensity of the light beam applied to the information record media is set to a proper value.

Since the laser beam emitted from the backward end of the bidirectional type semiconductor laser for emitting laser beams in two directions backward and forward is detected directly by the photodetector, the back monitor method has an advantage to be able to simplifying a monitor mechanism. However, when the back monitor method is applied to the use for information record, there was a problem that the APC circuit is greatly influenced by a return beam reflected and returned by the information record media. Therefore, the back monitor method is unsuitable for use as the information record.

SUMMARY OF THE INVENTION

The invention overcomes the above described problem. An object of the invention is to provide an optical pickup apparatus comprising a monitor mechanism capable of being applied to both of intensity control of a light beam for information record and intensity control of a light beam for information reproduction wherein the number of parts thereof is small; and miniaturization and weight reduction thereof are enabled.

In order to achieve the object, according to a first aspect of the invention, there is provided an optical pickup apparatus comprising:

a light emission source adapted to emit a light beam;
a control unit for controlling the light emission source to adjust the light beam to a predetermined intensity;
a reflective mirror having a first surface on which the light beam is incident and a second surface, the reflective mirror adapted to reflect the light beam in a direction different from an incident direction of the light beam at a predetermined reflectance and to transmit the light beam to the second surface at a predetermined transmittance; and
a photodetection unit disposed in a second surface direction with respect to the reflective mirror, the photodetection unit adapted to detect the light beam transmitting the reflective mirror,
wherein an information recording medium is disposed in the direction different from the incident direction; and
the control unit controls the light emission source based on a detection output of the photodetection unit.

According to an optical pickup apparatus with such a configuration of the invention, when a light beam for information record or information reproduction is incident from the light emission source to the reflective mirror, the reflective mirror reflects the incident beam to the side of the information record medium at the predetermined reflectance and transmits the light beam to the side of the photodetection unit provided in the second surface direction at a predetermined transmittance. Then, on the basis of the detection output of the photodetection unit, the control unit controls the light emission source so as to adjust the light beam for the information record or information reproduction to the proper intensity.

Therefore, any light beams for the information record and the information reproduction can be detected by one photodetection unit, and the invention can realize the optical pickup apparatus with the above described structure capable of, for example, a reduction in the number of parts, miniaturization of apparatus scale and weight reduction and also, on the basis of the detection output of the photodetection unit, APC control of the light emission source can be performed so that any light beams for the information record and the information reproduction become the proper intensity.

Also, in order to achieve the object, according to a second aspect of the invention, there is provided an optical pickup apparatus comprising:

a light emission source adapted to emit a light beam;
a control unit for controlling the light emission source to adjust the light beam to a predetermined intensity;
a reflective mirror having a first surface on which the light beam is incident and a second surface, the reflective mirror adapted to reflect the light beam in a direction different from an incident direction of the light beam at a predetermined reflectance and to transmit the light beam to the second surface at a predetermined transmittance; and
a photodetection unit disposed in the direction, the photodetection unit adapted to detect the light beam reflected by the reflective mirror,
wherein an information medium is disposed in a second surface direction with respect to the reflective mirror; and the control unit controls the light emission source based on a detection output of the photodetection unit.

According to the optical pickup apparatus with the above described configuration of the invention, when the light beam for information record or information reproduction is incident from the light emission source to the reflective mirror, the reflective mirror transmits the incident beam to the side of the information record medium located in the second surface direction at a predetermined transmittance. Further, the light beam is reflected to the direction, which is the side of the photodetection unit, at the predetermined reflectance.

Therefore, any light beams for the information record and the information reproduction can be detected by one photodetection unit, and the invention realize the optical pickup apparatus with the above described structure capable of, for example, a reduction in the number of parts, miniaturization of apparatus scale and weight reduction and also, on the basis of the detection output of the photodetection unit, APC control of the light emission source can be performed so that any light beams for the information record and the information reproduction become the proper intensity.

Also, in order to achieve the object, according to a third aspect of the invention, there is provided the optical pickup apparatus according to any one of the first and second aspects, wherein the reflective mirror has a transparent medium;

the first and second surfaces are not parallel to each other; and one of the first and second surfaces has a semi-transmission film having the predetermined reflectance and the predetermined transmittance.

According to an optical pickup apparatus with the above described configuration of the invention, a multiple reflected light beam occurring in case that the light beam for the information record or information reproduction is incident to the semi-transmission film of the reflective mirror can be reduced so as not to reach the side of the information record medium and the side of the photodetection unit. That is, by the surfaces, which are not parallel to each other, the multiple reflected light beam is reflected and transmitted in a direction deviating from an optical path. As a result of that, an influence of the multiple reflected light beam can be reduced to perform photodetection necessary to control the light emission source, and the light emission intensity of the light emission source can be controlled with high accuracy.

DETAILED DESCRIPTION OF THE PREFERRED EMBODIMENTS

Embodiments of an optical pickup apparatus of the invention will be described below with reference to the drawings. Incidentally, an optical pickup apparatus provided in an information recording and reproducing apparatus capable of information record and information reproduction with respect to a write once DVD and a rewritable DVD, a write once CD and a rewritable CD will be described as one embodiment.

Figure 1:
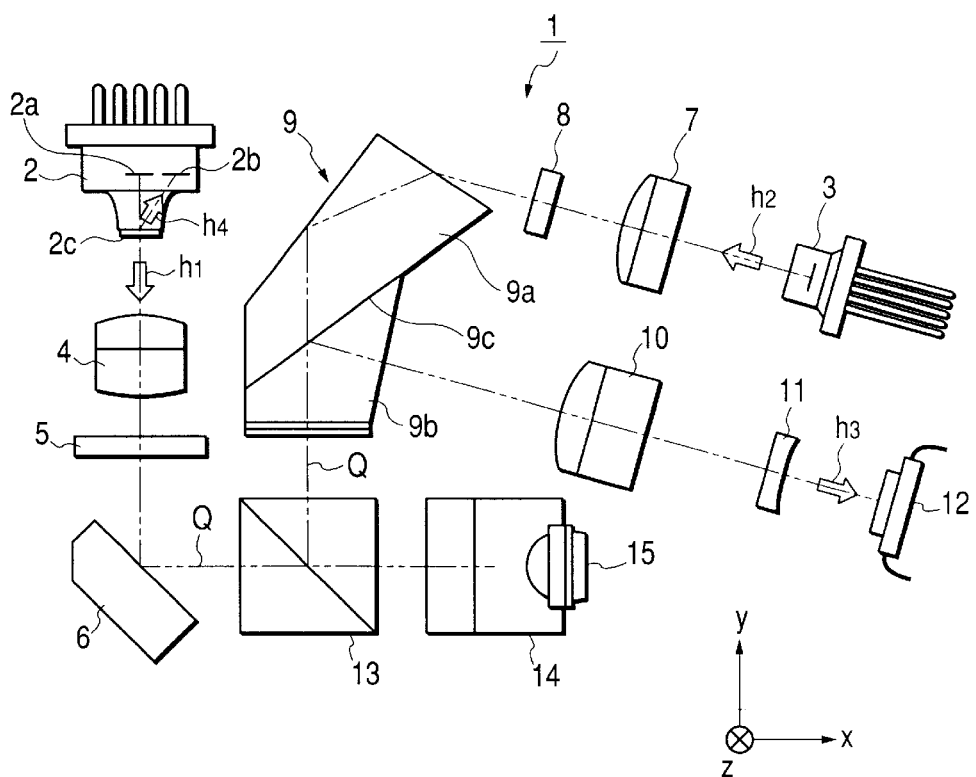
FIG. 1 is a plan view showing a configuration of an optical pickup apparatus of an embodiment.
Figure 2:
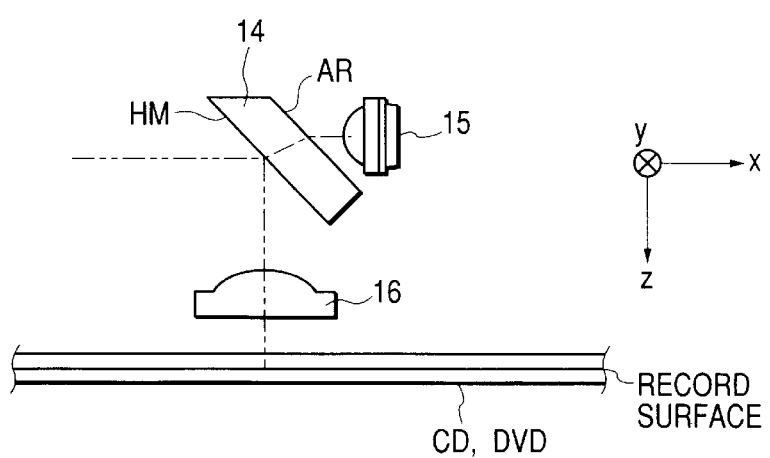
FIG. 2 is a side view showing a part of the configuration of the optical pickup apparatus of the embodiment.

FIGS. 1 and 2 show a configuration of an optical pickup apparatus of the present embodiment. FIG. 1 is a plan view of case of viewing the optical pickup apparatus from a z-axis direction of three-dimensional orthogonal coordinates xyz. FIG. 2 is a side view of case of viewing a part of the optical pickup apparatus from a y-axis direction.

In FIG. 1, the present optical pickup apparatus 1 comprises a hologram unit 2, a first semiconductor laser 2a for emitting a laser beam $h_1$ with a predetermined wavelength $\lambda_1$ (780 nm) in the case of making information record or information reproduction with respect to the CD, and a second semiconductor laser 3 for emitting a laser beam $h_2$ with a predetermined wavelength $\lambda_2$ (650 nm) in the case of making information record or information reproduction with respect to the DVD.

The hologram unit 2 includes the first semiconductor laser 2a, a beam split hologram 2c for splitting a laser beam $h_4$ which is a beam (hereinafter called "return beam") with a wavelength $\lambda_1$ reflected and returned by the CD from an optical path of the laser beam $h_1$, and a photoelectric conversion element 2b for receiving the laser beam $h_4$ split from the optical path of the laser beam $h_1$.

Also, while a collimator lens 4 for forming the laser beam $h_1$ into a parallel light beam, a quarter-wave plate 5, and a total reflection mirror 6 are placed in alignment of an optical axis with respect to the emission end of the first semiconductor laser 2a, a collimator lens 7 for forming the laser beam $h_2$ into a parallel light beam, a diffraction grating 8, and a shaping prism 9 are placed in alignment of an optical axis with respect to the emission end of the second semiconductor laser 3.

The shaping prism 9 is a deflection angle prism in which two prisms 9a, 9b are bonded each other, and while a direction of the laser beam $h_2$ incident from the side of the diffraction grating 8 is changed to emit the beam to the side of a beam splitter 13 described below, a laser beam (hereinafter called "return beam") with a wavelength $\lambda_2$ returned from the side of the beam splitter 13 and reflected by the DVD is reflected by a bonded surface 9c of the prisms 9a, 9b to emit the beam in a predetermined direction.

Further, while a collimator lens 10 for gathering the return beam reflected by the bonded surface 9c of the shaping prism 9 and an aspherical lens 11 for aberration correction are provided, a photoelectric conversion element 12 for receiving and converting the gathered return beam $h_3$ into an electrical signal to output the electrical signal is provided.

The output signal of the photoelectric conversion element 12 is supplied to an RF amplifier (not shown) and control of various servos such as a focus servo is performed or process of reproducing information recorded on the DVD is performed.

A beam splitter 13 is placed in a position at which optical axis centers Q of both of the total reflection mirror 6 and the shaping prism 9 intersect, in other words, in a position at which optical paths of the laser beams $h_1$, $h_2$ intersect.

A reflective mirror 14 is placed in the opposite side of the total reflection mirror 6 through the beam splitter 13 and further as shown in FIG. 2, a photoelectric conversion element 15 acting as photodetection unit for monitor for detecting the intensity of the laser beams $h_1$ and $h_2$ is placed in the rear of the reflective mirror 14 and an objective lens 16 opposite to a record surface of the CD or DVD mounted in a so-called clamp position is placed below the reflective mirror 14.

Here, the reflective mirror 14 is provided to incline at an angle of about 45° with respect to the beam splitter 13 and the objective lens 16 and has a medium with a transparent parallel plate shape with respect to the laser beams $h_1$, $h_2$ as a substrate.

A thin film coating of a semi-transmission film HM with predetermined reflectance and transmittance made of a dielectric material is applied to one surface (surface facing to the side of the beam splitter 13 and the objective lens 16) of the substrate, and a thin film coating of an anti-reflection coat film AR made of a dielectric material is applied to the other surface (surface facing to the side of the photoelectric conversion element 15) of the substrate.

In the embodiment, the semi-transmission film HM is set so that the laser beams $h_1$ with the wavelength $\lambda_1$ (780 nm) and the laser beams $h_2$ with the wavelength $\lambda_2$ (650 nm) incident from the side of the beam splitter 13 are reflected to the side of the objective lens 16 at a reflectance of about 90%, respectively and the residual about 10% of the laser beams $h_1$, $h_2$ are transmitted to be emitted to the side of the photoelectric conversion element 15. Also, a reflectance of the anti-reflection coat film AR with respect to the laser beams $h_1$, $h_2$ is set to less than 1% (in other words, a transmittance of 99% or more).

Figure 4:
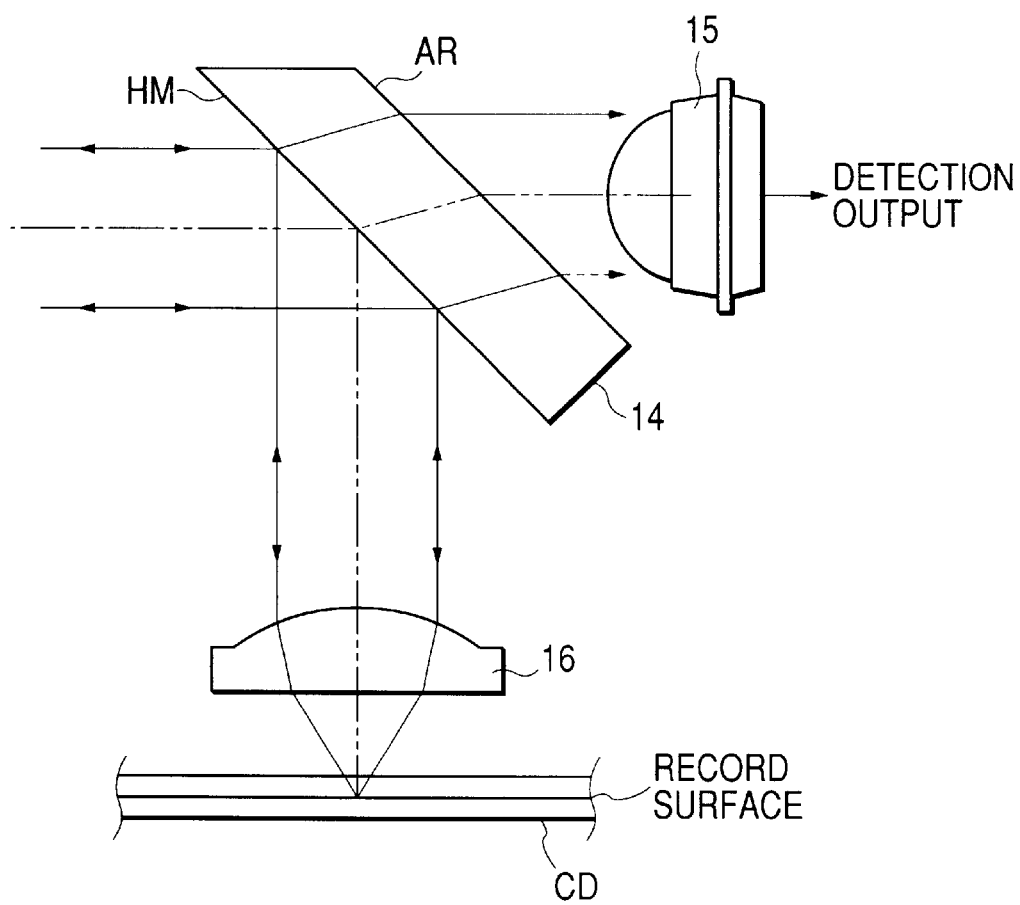
FIG. 4 shows a photodetection operation in the case of making information record or information reproduction with respect to the CD.
Figure 5:
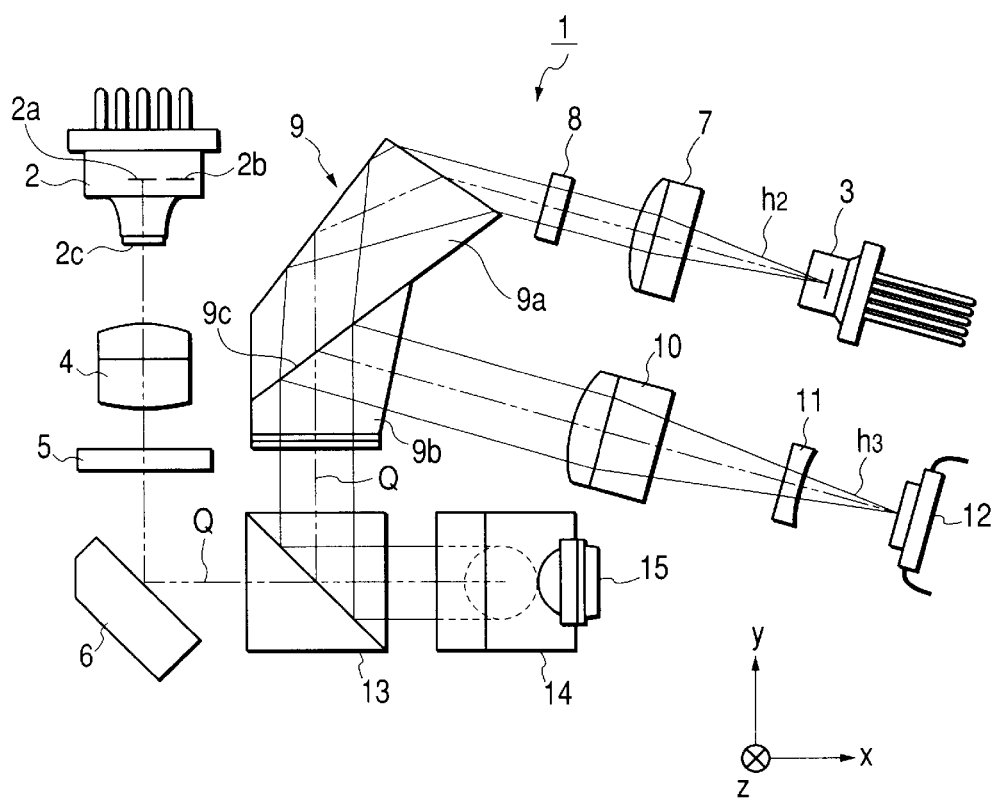
FIG. 5 shows an operation in case of making information record or information reproduction with respect to a DVD.
Figure 6:
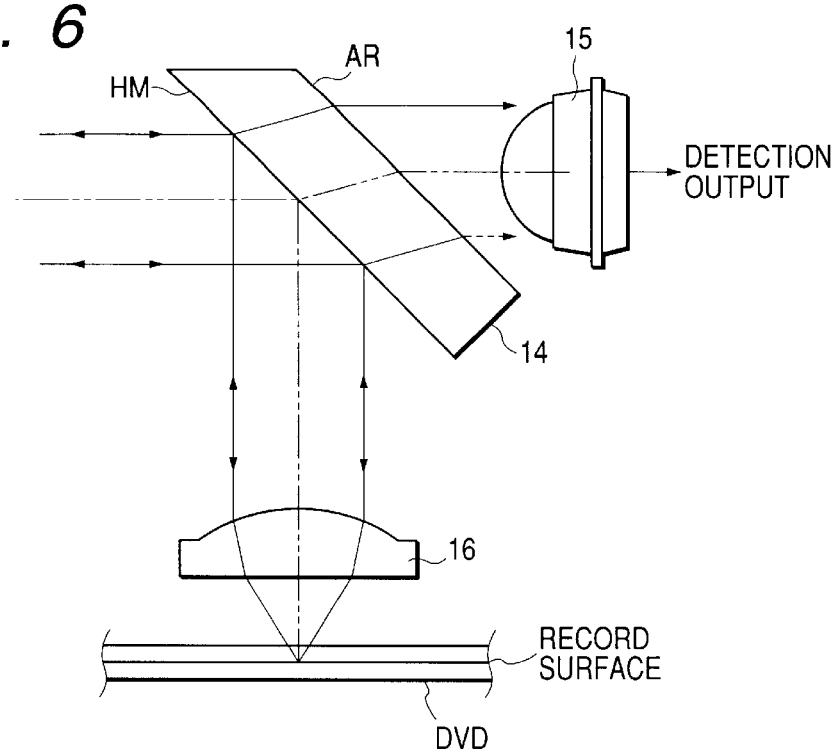
FIG. 6 shows a photodetection operation in the case of making information record or information reproduction with respect to the DVD.

Next, an operation of the optical pickup apparatus with such a configuration will be described with reference to FIGS. 3 to 6. Incidentally, FIGS. 3 and 4 show an operation in case of making information record or information reproduction with respect to a CD, and FIGS. 5 and 6 show an operation in case of making information record or information reproduction with respect to a DVD.

Figure 3:
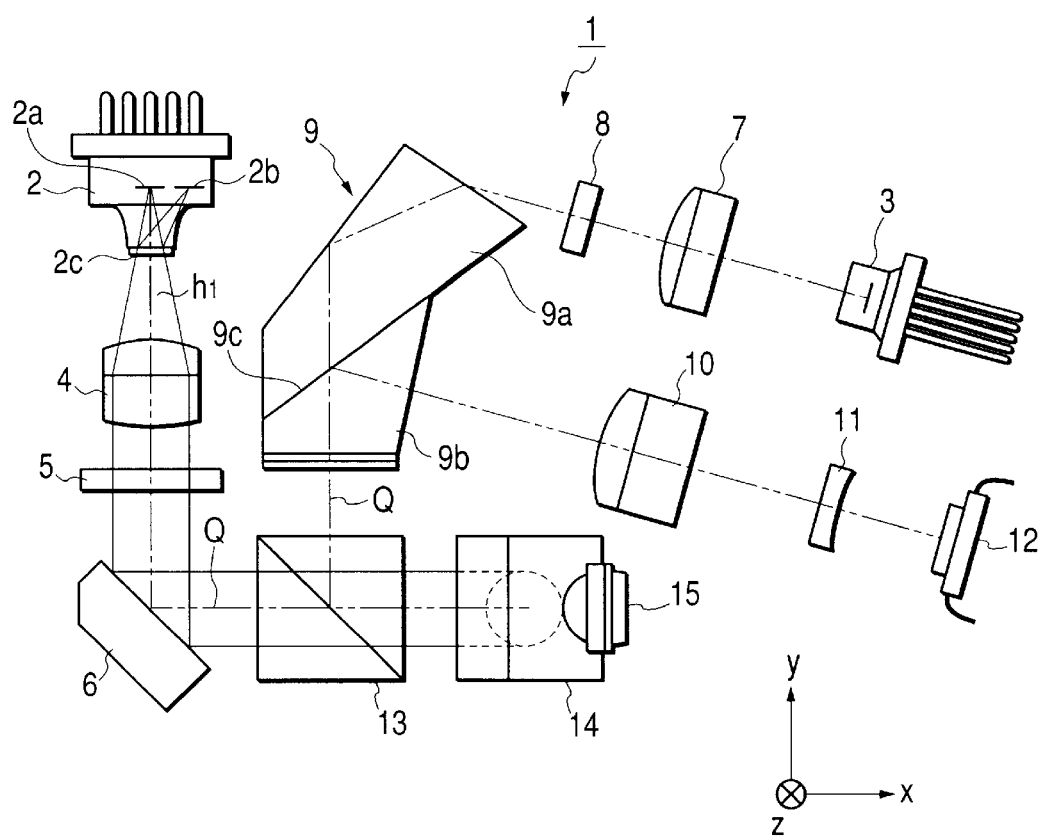
FIG. 3 shows an operation in case of making information record or information reproduction with respect to a CD.

In the case of making information record to the CD or making information reproduction from the CD, as shown in FIG. 3, a laser beam $h_1$ with a wavelength $\lambda_1$ is emitted from the first semiconductor laser 2a and the second semiconductor laser 3 is set in a turn-off state.

Describing in more detail, in the case of making the information record to the CD, using a so-called power strategy method, the laser beam $h_1$ modulated on a basis of record data is emitted from the first semiconductor laser 2a and the second semiconductor laser 3 is set in a turn-off state.

In the case of making the information reproduction from the CD, the laser beam $h_1$ with constant intensity is emitted from the first semiconductor laser 2a and the second semiconductor laser 3 is set in a turn-off state.

Further, in any cases of the information record and the information reproduction, by an APC circuit (automatic power control circuit) described below, driving electric power for emitting the first semiconductor laser 2a is controlled and feedback control is performed so that the intensity of the laser beam $h_1$ becomes a predetermined target value.

First, an operation in the case of making the information record to the CD will be described. When a laser beam $h_1$ for information record is emitted from the first semiconductor laser 2a, the laser beam $h_1$ passes the collimator lens 4 and the quarter-wave plate 5 and is reflected by the total reflection mirror 6 and passes through the beam splitter 13 and reaches the reflective mirror 14.

Here, as shown in FIG. 4, about 90% of the laser beam $h_1$ is reflected by the semi-transmission film HM and is converged to a fine light beam by the objective lens 16 and is applied to a record surface of the CD and the information record is made.

Further, about 10% of the laser beam $h_1$ passes through the semi-transmission film HM and is received by the photoelectric conversion element 15. Then, a detection output of the photoelectric conversion element 15 is supplied to the APC circuit (not shown) and the APC circuit performs the feedback control of the driving electric power of the semiconductor laser 2a so that the intensity of the laser beam $h_1$ becomes the predetermined target value, and thereby the light beam applied to the record surface of the CD is automatically adjusted to proper intensity.

Also, a return beam caused by reflecting the light beam by the record surface of the CD passes the objective lens 16 and is reflected by the reflective mirror 14 and proceeds to the beam splitter 13 and further passes through the beam splitter 13 and is received by the photoelectric conversion element 2b sequentially via the total reflection mirror 6, the quarter-wave plate 5, the collimator lens 4 and the beam split hologram 2c to perform servo control such as auto-focus on a basis of an output signal of the photoelectric conversion element 2b.

Next, an operation in the case of making the information reproduction from the CD will be described. In a manner similar to that shown in FIG. 3, when the laser beam $h_1$ for information reproduction is emitted from the first semiconductor laser 2a, the laser beam $h_1$ passes the collimator lens 4 and the quarter-wave plate 5 and is reflected by the total reflection mirror 6 and passes through the beam splitter 13 and reaches the reflective mirror 14.

Here, in a manner similar to that shown in FIG. 4, about 90% of the laser beam $h_1$ is reflected by the semi-transmission film HM and is converged to a fine light beam by the objective lens 16 and is applied to the record surface of the CD and the information reading is made.

Further, about 10% of the laser beam $h_1$ passes through the semi-transmission film HM and is received by the photoelectric conversion element 15. Then, the detection output of the photoelectric conversion element 15 is supplied to the APC circuit and the APC circuit performs the feedback control of the driving electric power of the semiconductor laser 2a so that the intensity of the laser beam $h_1$ becomes a predetermined target value, and thereby the light beam applied to the record surface of the CD is automatically adjusted to proper intensity.

Also, a return beam caused by reflecting the light beam by the record surface of the CD passes the objective lens 16 and is reflected by the reflective mirror 14 and proceeds to the beam splitter 13 and further passes through the beam splitter 13 and is received by the photoelectric conversion element 2b sequentially via the total reflection mirror 6, the quarter-wave plate 5, the collimator lens 4 and the beam split hologram 2c, and the information reproduction is made on the basis of the output signal of the photoelectric conversion element 2b.

Next, an operation in the case of making information record to the DVD or making information reproduction from the DVD will be described.

In the case of making information record or information reproduction with respect to the DVD, as shown in FIG. 5, the laser beam $h_2$ with a wavelength $\lambda_2$ is emitted from the second semiconductor laser 3 and the first semiconductor laser 2a is set in a turn-off state.

Also, in the case of making the information record to the DVD, using the so-called power strategy method, the laser beam $h_2$ modulated on a basis of record data is emitted from the second semiconductor laser 3 and the first semiconductor laser 2a is set in a turn-off state. Also, in the case of making the information reproduction from the DVD, the laser beam $h_2$ with constant intensity is emitted from the second semiconductor laser 3 and the first semiconductor laser 2a is set in a turn-off state.

Further, in any cases of the information record and the information reproduction, by the APC circuit, driving electric power for emitting the second semiconductor laser 3 is controlled and feedback control is performed so that the intensity of the laser beam $h_2$ becomes a predetermined target value.

First, an operation in the case of making the information record to the DVD will be described. When the laser beam $h_2$ for information record is emitted from the second semiconductor laser 3, the laser beam $h_2$ passes the collimator lens 7, the diffraction grating 8 and the shaping prism 9 and is reflected by the beam splitter 13 and reaches the reflective mirror 14.

Here, as shown in FIG. 6, about 90% of the laser beam $h_2$ is reflected by the semi-transmission film HM and is converged to a fine light beam by the objective lens 16 and is applied to a record surface of the DVD and the information record is made.

Further, about 10% of the laser beam $h_2$ passes through the semi-transmission film HM and is received by the photoelectric conversion element 15. Then, a detection output of the photoelectric conversion element 15 is supplied to the APC circuit and the APC circuit performs feedback control of the driving electric power of the semiconductor laser 3 so that the intensity of the laser beam $h_2$ becomes the predetermined target value, and thereby the light beam applied to the record surface of the DVD is automatically adjusted to proper intensity.

Also, a return beam caused by reflecting the light beam by the record surface of the DVD passes the objective lens 16 and is reflected by the reflective mirror 14 and further is reflected by the beam splitter 13 and is incident to the shaping prism 9. Then, the return beam incident to the shaping prism 9 is reflected by the bonded surface 9c and also is gathered by the collimator lens 10 and the aspherical lens 11 and is received by the photoelectric conversion element 12. Then, servo control such as auto-focus is performed on a basis of an output signal of this photoelectric conversion element 12.

Next, an operation in the case of making the information reproduction from the DVD will be described. In a manner similar to that shown in FIG. 5, when the laser beam $h_2$ for information reproduction is emitted from the second semiconductor laser 3, the laser beam $h_2$ passes the collimator lens 7, the diffraction grating 8 and the shaping prism 9 and is reflected by the beam splitter 13 and is incident to the reflective mirror 14.

Here, in a manner similar to that shown in FIG. 6, about 90% of the laser beam $h_2$ is reflected by the semi-transmission film HM and is converged to a fine light beam by the objective lens 16 and is applied to the record surface of the DVD and the information reading is made.

Further, about 10% of the laser beam $h_2$ passes through the semi-transmission film HM and is received by the photoelectric conversion element 15. Then, the detection output of the photoelectric conversion element 15 is supplied to the APC circuit and the APC circuit performs the feedback control of the driving electric power of the semiconductor laser 3 so that the intensity of the laser beam $h_2$ becomes the predetermined target value, and thereby the light beam applied to the record surface of the DVD is automatically adjusted to proper intensity.

Also, a return beam caused by reflecting the light beam by the record surface of the DVD passes the objective lens 16 and is reflected by the reflective mirror 14 and further is reflected by the beam splitter 13 and is incident to the shaping prism 9. Then, the return beam incident to the shaping prism 9 is reflected by the bonded surface 9c and also is gathered by the collimator lens 10 and the aspherical lens 11 and is received by the photoelectric conversion element 12. Then, the information reproduction is made on the basis of the output signal of the photoelectric conversion element 12.

As the above described, the optical pickup apparatus 1 of the embodiment comprises the reflective mirror 14 for reflecting the laser beams $h_1$, $h_2$ with different wavelengths $\lambda_1$, $\lambda_2$ to the side of the objective lens 16 at a predetermined reflectance while transmitting the laser beams $h_1$, $h_2$ to the side of the photoelectric conversion element 15 at a predetermined transmittance. Thus, there is provided a configuration capable of detecting a part of the laser beams $h_1$ and $h_2$ by one photoelectric conversion element 15 in any cases of information record or information reproduction by the laser beam $h_1$ and information record or information reproduction by the laser beam $h_2$.

Each of intensity of the laser beams $h_1$, $h_2$ can be detected by only one photoelectric conversion element 15 placed in the rear of the reflective mirror 14. The APC control of the semiconductor lasers 2a, 3, which are light emission sources, can be performed on a basis of the detection outputs.

As a result of this, according to the embodiment, the number of parts of an optical system for detecting the intensity of each the laser beam $h_1$, $h_2$ for CD and DVD can be reduced remarkably, and a simple, small and lightweight optical pickup apparatus can be provided.

Further, in the embodiment, the photoelectric conversion element 15 is provide in the rear of the reflective mirror 14, and thereby there is implemented a monitor mechanism having a front monitor method of a configuration for detecting each of intensity of the laser beams $h_1$, $h_2$ emitted from the semiconductor lasers 2a, 3 in an optical path position before applying the laser beams to the CD and the DVD, which are an information record medium.

Further, the optical pickup apparatus 1 of the embodiment not only implements the front monitor method but also produces excellent effects capable of simplicity, miniaturization and weight reduction by using the configuration as described above.

Figure 7:
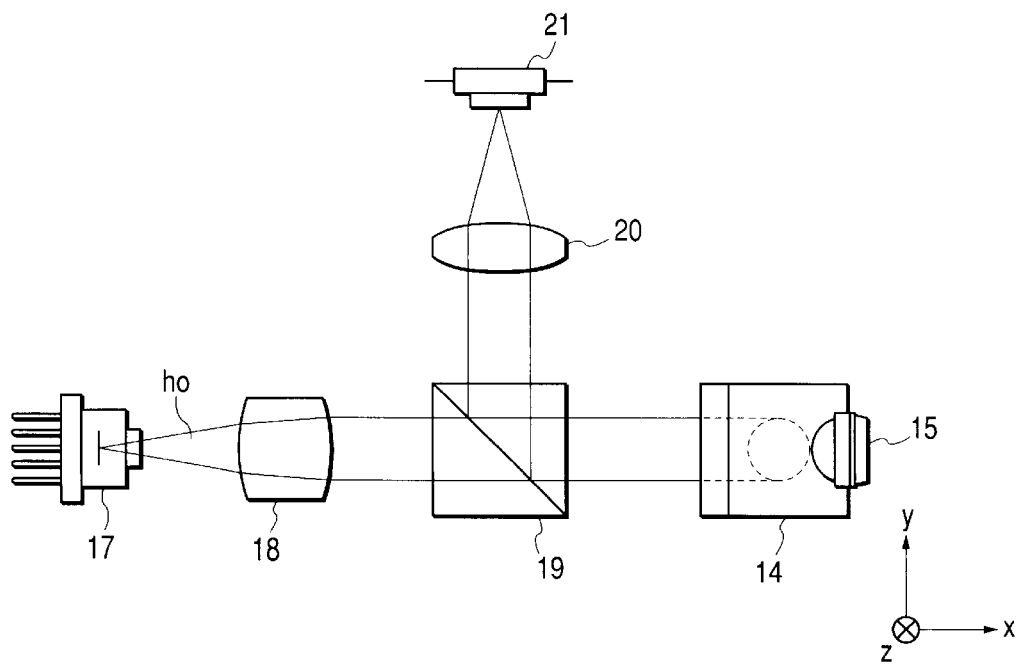
FIG. 7 is a plan view showing a configuration of a modified example of an optical pickup apparatus.
Figure 8:
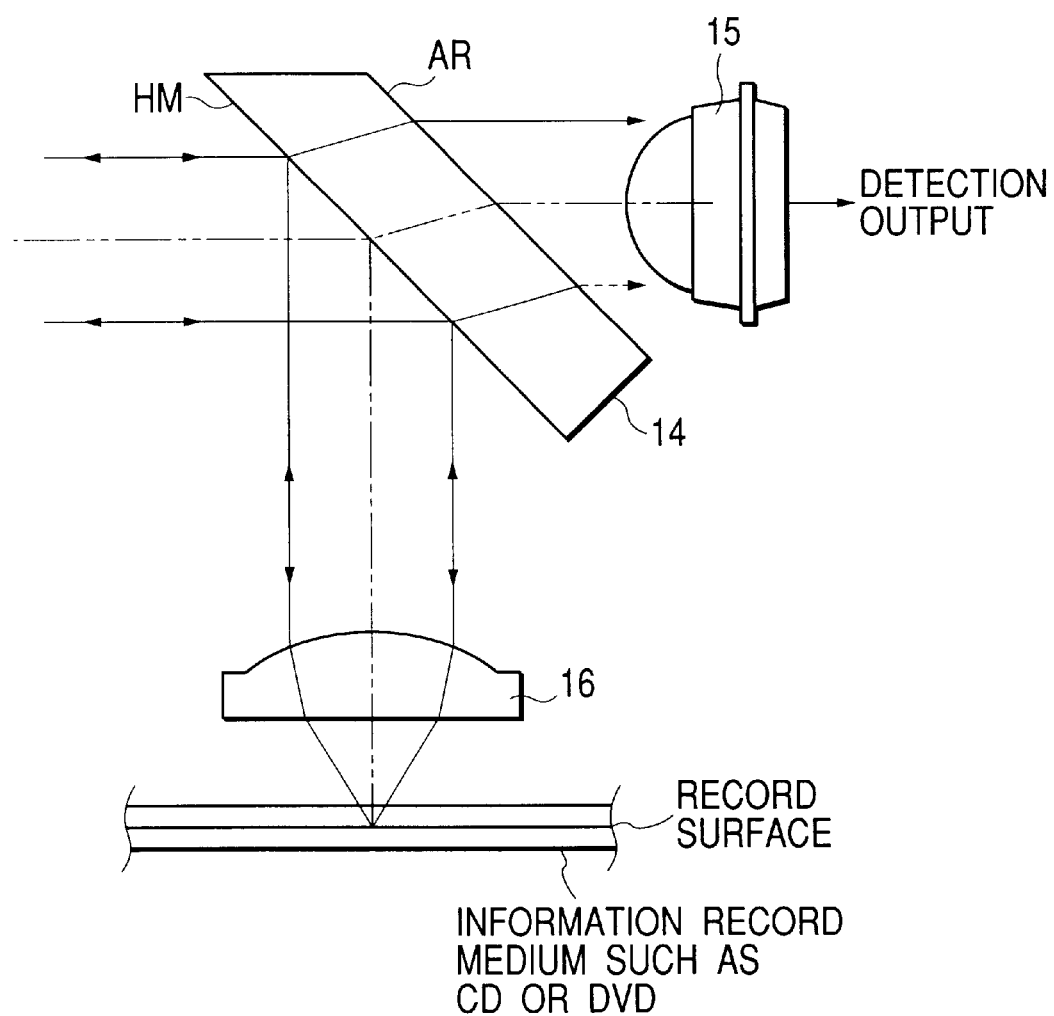
FIG. 8 is a side view showing a part of the configuration of the modified example shown in FIG. 7.

Incidentally, in the embodiment described above, the optical pickup apparatus having compatibility for making information record or information reproduction with respect to the CD and the DVD has been described, but the invention can also be applied to an optical pickup apparatus for making information record or information reproduction with respect to a particular information record medium by a laser beam $\lambda_0$ with a single wavelength $\lambda_0$ as shown in FIGS. 7 and 8.

That is, as shown in FIGS. 7 and 8, an optical pickup apparatus comprises a semiconductor laser 17 for emitting a laser beam $h_0$ for information record or information reproduction with a wavelength $\lambda_0$, a collimator lens 18 for forming the laser beam $h_0$ into a parallel light beam, a beam splitter 19, an objective lens 16, and a collimator lens 20 for gathering a return beam reflected and returned by/from an information record medium to apply the return beam to the side of a photoelectric conversion element 21, wherein the reflective mirror 14 described above is placed between the beam splitter 19 and the objective lens 16 and also the photoelectric conversion element 15 for monitor is placed in the rear of the reflective mirror 14.

In such a configuration, when the laser beam $h_0$ for information record is emitted from the semiconductor laser 17 in the case of making the information record to the information record medium, the laser beam $h_0$ passes the collimator lens 18 and the beam splitter 19 and reaches the reflective mirror 14 and further as shown in FIG. 8, most of the laser beam $h_0$ (about 90%) is reflected by a semi-transmission film HM of the reflective mirror 14 and is gathered to a light beam by the objective lens 16 and is applied to the information record medium, and thereby the information record is made.

Further, a part of the laser beam $h_0$ (about 10%) is transmitted by the semi-transmission film HM of the reflective mirror 14 and is detected by the photoelectric conversion element 15 and detection output thereof is supplied to the APC circuit and the APC circuit performs feedback control of driving electric power of the semiconductor laser 17 so that the intensity of the laser beam $h_0$ becomes a predetermined target value, and thereby the light beam applied to the record surface of the information record medium is automatically adjusted to proper intensity.

Also, in the case of making the information reproduction to the information record medium, when a laser beam $h_0$ for information reproduction is emitted from the semiconductor laser 17, the laser beam $h_0$ passes the collimator lens 18 and the beam splitter 19 and is incident to the reflective mirror 14 and further, most of the laser beam $h_0$ is reflected by the semi-transmission film HM of the reflective mirror 14 and is gathered to a light beam by the objective lens 16 and is applied to the information record medium, and thereby the information reproduction is made. Further, a part of the laser beam $h_0$ is transmitted by the semi-transmission film HM of the reflective mirror 14 and is detected by the photoelectric conversion element 15 and detection output thereof is supplied to the APC circuit and the APC circuit performs feedback control of driving electric power of the semiconductor laser 17 so that the intensity of the laser beam $h_0$ becomes a predetermined target value, and thereby the light beam applied to a record surface of the information record medium is automatically adjusted to proper intensity.

Further, a return beam caused by applying the light beam for information reproduction to the information record medium passes the objective lens 16 and is reflected by the reflective mirror 14 and further in a manner similar to that shown in FIG. 8, is reflected by the beam splitter 19 and is gathered by the collimator lens 20 and is detected by the photoelectric conversion element 21, and thereby the information reproduction is made.

As the above described, the optical pickup apparatus for making information record or information reproduction with respect to the particular information record medium by the laser beam $h_0$ with the single wavelength $\lambda_0$, the optical pick apparatus comprises the reflective mirror 14, and thereby the intensity of the laser beam $h_0$ of the information record or information reproduction can be detected by one photoelectric conversion element 15 and APC control of the semiconductor laser 17, which is a light emission source, can be performed on a basis of the detection outputs.

Incidentally, in the embodiment and the modified example described above, the optical pickup apparatus using the reflective mirror 14 in which the anti-reflection coat film AR and the semi-transmission film HM are formed on the opposite surfaces of a substrate with a transparent parallel plate shape has been described, but the invention is not limited to this. A reflective mirror in which a semi-transmission film HM and an anti-reflection coat film AR are formed on surfaces of a substrate, which are not parallel to each other, may be applied.

Figure 9:
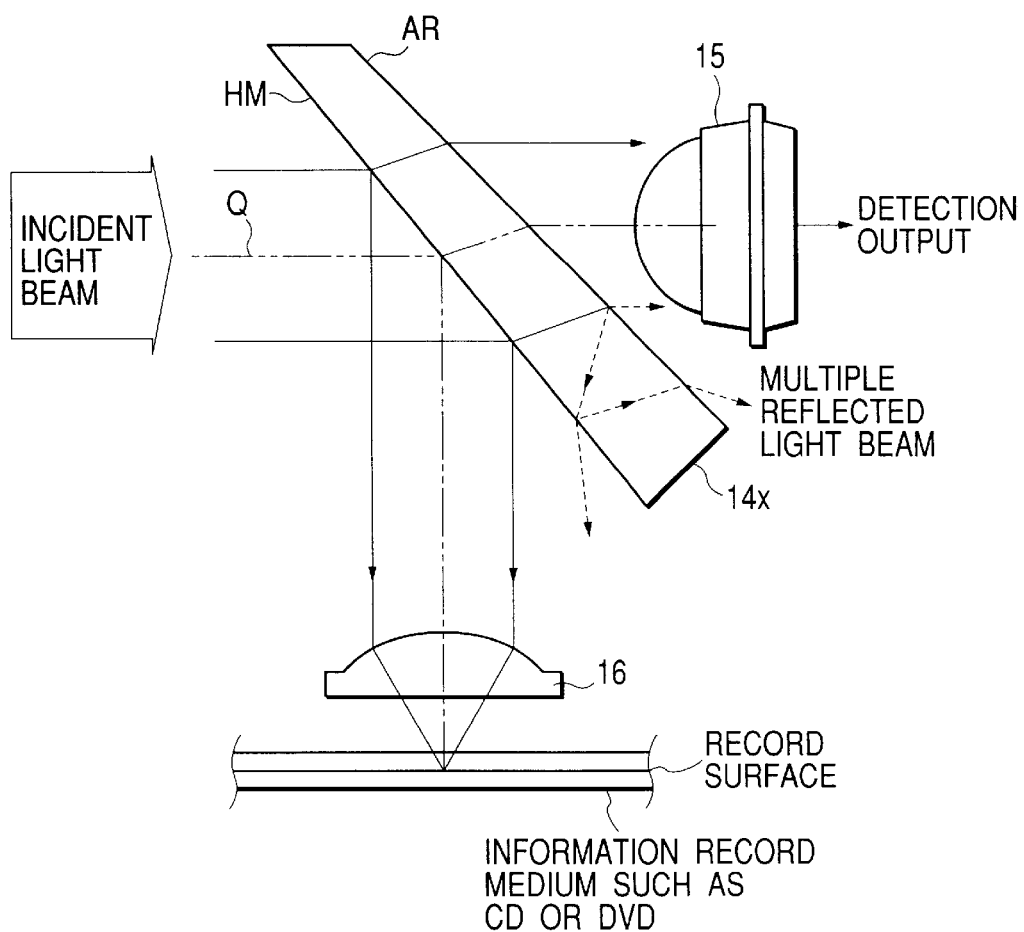
FIG. 9 shows a structure and an operation of a reflective mirror, of which surfaces are not parallel to each other.

That is, as shown in FIG. 9 corresponding to FIGS. 4 and 6, a reflective mirror 14x in which a semi-transmission film HM and an anti-reflection coat film AR are formed on surfaces of a substrate, which are not parallel to each other may be applied instead of the reflective mirror 14 having a substrate with a parallel plate shape.

A sectional shape of the substrate of this reflective mirror 14x is a wedge shape in which the thickness is thicker with approaching the objective lens 16 and is thinner with being distant from the objective lens 16.

When applying the reflective mirror 14x with such a structure, the following effect can be obtained. In the case of making information record or information reproduction with respect to information record media such as CD and DVD, as shown in FIG. 4, FIG. 6 and FIG. 8, when the laser beams $h_1$, $h_2$, $h_0$ are incident from the side of the beam splitter 13 (or 19) to the reflective mirror 14x, about 90% of the laser beams $h_1$, $h_2$, $h_0$ (for convenience, called "incident beam") are reflected by the semi-transmission film HM and further are formed into a fine light beam by the objective lens 16 and are applied to the information record media and on the other hand, about 10% of the incident beam passes through the semi-transmission film HM and further passes through the anti-reflection coat film AR and is incident to the photoelectric conversion element 15.

Here, most of the incident beam passes through the anti-reflection coat film AR and is incident to the photoelectric conversion element 15, but when a light beam, which is the incident beam slightly reflected by the anti-reflection coat film AR and reflected inside of the substrate in a multiple manner, is emitted to the side of the photoelectric conversion element 15, a problem that APC control with great accuracy cannot be realized occurs.

However, according to the reflective mirror 14x having the section of the wedge shape, the problem can be improved remarkably.

That is, the light beam reflected by the semi-transmission film HM of the reflective mirror 14x is incident to the side of the objective lens 16 along an optical axis Q. As opposed to this, the multiple reflected beam (shown by dotted lines with arrows in FIG. 9) propagates in a direction deviating from the optical axis Q inside the substrate and also attenuates gradually while repeating reflection and transmission.

Further, since the sectional shape of the substrate is the wedge shape described above, when the multiple reflected beam propagating inside the substrate passes through the anti-reflection coat film AR and the semi-transmission film HM, the multiple reflected beam is emitted toward a direction outward from the optical axis Q rather than parallel to the optical axis Q. Therefore, the multiple reflected beam is emitted to a direction deviating from the photoelectric conversion element 15, so that an influence of the multiple reflected beam on the photoelectric conversion element 15 can be reduced remarkably.

In this manner, when the reflective mirror 14x with the wedge shape is applied, the influence of the multiple reflected beam can be suppressed to perform the APC control with great accuracy.

Figure 10:
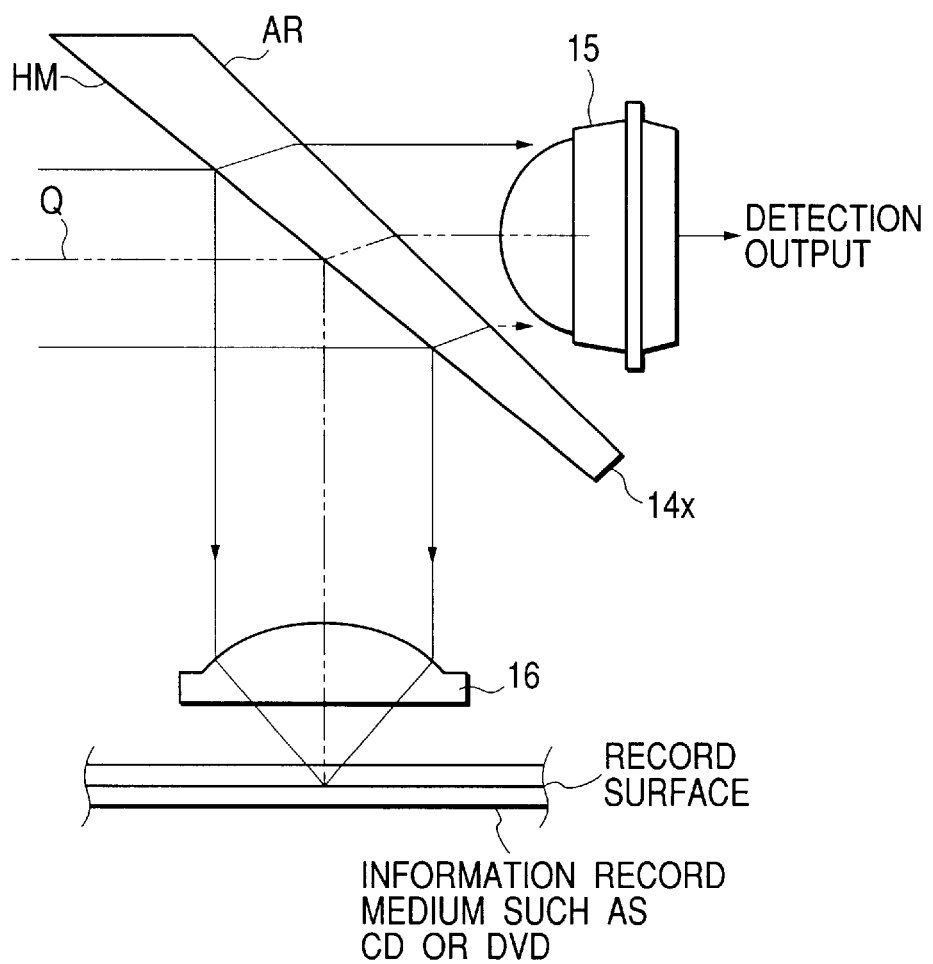
FIG. 10 shows a structure and an operation of another standing, of which surfaces are not parallel to each other.

Furthermore, as shown in FIG. 10, the thickness of the substrate of the reflective mirror 14x may be reversed compared with the case of FIG. 9. That is, a sectional shape of the substrate of the reflective mirror 14x may be formed into a wedge shape in which the thickness is thinner with approaching the objective lens 16 and is thicker with being distant from the objective lens 16.

Also in the case of such a structure, while the transmitted beam passing through the semi-transmission film HM and the anti-reflection coat film AR is incident to the photoelectric conversion element 15 along the optical axis Q, the multiple reflected beam reflected to the inside of the substrate at the semi-transmission film HM and the anti-reflection coat film AR propagates in the direction deviating from the optical axis Q, so that the influence of the multiple reflected beam on the photoelectric conversion element 15 can be reduced remarkably.

Furthermore, the reflective mirror 14 shown in FIGS. 1 to 10 have a structure in which the laser beams $h_1$, $h_2$, $h_0$ for making information record or information reproduction are incident from the side of the semi-transmission film HM and the anti-reflection coat film AR is formed on the back surface (surface opposite to the photoelectric conversion element 15) of the substrate. However, in reverse to this, it may be constructed so that the anti-reflection coat film AR is formed on a surface to which the laser beams $h_1$, $h_2$, $h_0$ for making information record or information reproduction are incident and the semi-transmission film HM is formed on the back surface of the substrate.

That is, the semi-transmission film HM having the reflectance and transmittance set so that the optical intensity of a laser beam transmitted to the side of the photoelectric conversion element 15 becomes smaller than the optical intensity of a laser beam reflected to the side of the objective lens 16 may be formed on the back surface of the substrate of the reflective mirror 14.

Furthermore, the anti-reflection coat film AR may be omitted according to design specifications.

Furthermore, in the optical pickup apparatus described above, there is provided a configuration in which the incident laser beams $h_1$, $h_2$, $h_0$ are reflected to the side of the objective lens 16 by the reflective mirrors 14, 14x and also a part of the transmitted beam is detected by the photoelectric conversion element 15. However, the invention is not limited to this. That is, there may be provided a configuration in which positions of the photoelectric conversion element 15 and the objective lens 16 are replaced with each other and an information record medium such as CD or DVD is clamped in the side of the replaced objective lens 16 and information record or information reproduction is made. Incidentally, in the case of such a configuration, there is provided a configuration in which the incident laser beams $h_1$, $h_2$, $h_0$ are transmitted to the side of the objective lens 16 by the semi-transmission film HM and are reflected to the side of the photoelectric conversion element 15. As a result of this, by setting the reflectance and transmittance of the semi-transmission film HM so that the optical intensity of a laser beam reflected to the side of the photoelectric conversion element 15 becomes smaller than the optical intensity of a laser beam transmitted to the side of the objective lens 16, the effect similar to that of the optical pickup apparatus described on the basis of FIGS. 1 to 10 can be obtained.

As described above, according to an optical pickup apparatus of the invention, by placing a reflective mirror in an optical path between a light emission source and an information record medium, an incident beam for information record or the information reproduction is reflected (or transmitted) to the side of the information record medium and also is transmitted (or reflected) to the side of photoelectric conversion unit, so that any beams for the information record and the information reproduction can be detected by one photodetection unit. As a result of this, an optical pickup apparatus with a structure capable of, for example, a reduction in the number of parts, miniaturization of apparatus scale and weight reduction can be implemented and also, on a basis of a detection output of the photodetection unit, APC control of the light emission source can be performed so that any beams for the information record and the information reproduction become the proper intensity.

Also, the reflective mirror is formed of a transparent medium having a first surface and a second surface, which are not parallel to each other, so that an influence of a multiple reflected beam occurring in case of incidence of the beam can be reduced. As a result of this, photodetection necessary to control the light emission intensity of the light emission source can be performed and the light emission intensity of the light emission source can be controlled with high accuracy.

What is claimed is:

1. An optical pickup apparatus comprising:

a plurality of light emission sources adapted to emit light beams having different wavelengths, respectively;

a control unit for controlling the light emission sources to adjust the light beams to a predetermined intensity;

a reflective mirror having a first surface on which the light beams are incident and a second surface, the reflective mirror adapted to reflect each of the light beams emitted from the light emission sources in a direction perpendicular to an incident direction of the light beam at a predetermined reflectance and to transmit the light beam to the second surface at a predetermined transmittance;

a beam splitter disposed between the light emission sources and the reflective mirror, the beam splitter adapted to transmit or reflect the light emitted from the light emission sources; and a photodetection unit disposed in a second surface direction with respect to the reflective mirror, the photodetection unit adapted to detect the light beam transmitted by the reflective mirror, wherein an information recording medium is disposed in the direction different from the incident direction, and the control unit controls the light emission sources based on a detection output of the photodetection unit.

2. The optical pickup apparatus according to claim 1, wherein the reflective mirror has a transparent medium;

the first and second surfaces are parallel to each other; and one of the first and second surfaces has a semi-transmission film having the predetermined reflectance and the predetermined transmittance.

3. The optical pickup apparatus according to claim 1, wherein the reflective mirror has a transparent medium;

the first and second surfaces are not parallel to each other; and one of the first and second surfaces has a semi-transmission film having the predetermined reflectance and the predetermined transmittance.

4. An optical pickup apparatus comprising:

a plurality of light emission sources adapted to emit light beams having different wavelengths, respectively;

a control unit for controlling the light emission sources to adjust the light beams to a predetermined intensity;

a reflective mirror having a first surface on which the light beams are incident and a second surface, the reflective mirror adapted to reflect each of the light beams emitted from the light emission sources in a direction perpendicular to an incident direction of the light beam at a predetermined reflectance and to transmit the light beam to the second surface at a predetermined transmittance;

a photodetection unit disposed in the direction, the photodetection unit adapted to detect the light beam reflected by the reflective mirror, and a beam splitter disposed between the light emission sources and the reflective mirror, and between the reflective mirror and the photodetection unit, the beam splitter adapted to transmit or reflect the light emitted from the light emission sources and to reflect the light beam reflected by the reflective mirror, wherein an information medium is disposed in a second surface direction with respect to the reflective mirror, and the control unit controls the light emission sources based on a detection output of the photodetection unit.

5. The optical pickup apparatus according to claim 4, wherein the reflective mirror has a transparent medium;

the first and second surfaces are parallel to each other; and one of the first and second surfaces has a semi-transmission film having the predetermined reflectance and the predetermined transmittance.

6. The optical pickup apparatus according to claim 4, wherein the reflective mirror has a transparent medium;

the first and second surfaces are parallel to each other; and one of the first and second surfaces has a semi-transmission film having the predetermined reflectance and the predetermined transmittance.

* * * * *